United States Patent
Fujita (10) Patent No.: US 7,257,742 B2
(45) Date of Patent: Aug. 14, 2007

(54) DISK REPRODUCING APPARATUS

(75) Inventor: Yoshikazu Fujita, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 510 days.

(21) Appl. No.: 10/318,157

(22) Filed: Dec. 13, 2002

(65) Prior Publication Data

US 2003/0115512 A1  Jun. 19, 2003

(30) Foreign Application Priority Data

Dec. 14, 2001  (JP)  ............... P 2001-381063

(51) Int. Cl.
*G06F 11/00*  (2006.01)
(52) U.S. Cl. ...................................... 714/48
(58) Field of Classification Search ............... 714/48; 710/61

See application file for complete search history.

(56) References Cited

U.S. PATENT DOCUMENTS

| | | | | |
|---|---|---|---|---|
| 4,081,611 A | * | 3/1978 | Bovo et al. | 370/244 |
| 4,096,567 A | * | 6/1978 | Millard et al. | 707/10 |
| 4,213,201 A | * | 7/1980 | Gagnier et al. | 370/220 |
| 4,398,264 A | * | 8/1983 | Couper et al. | 715/530 |
| 4,829,524 A | * | 5/1989 | Yoshida | 714/748 |
| 4,920,533 A | * | 4/1990 | Dufresne et al. | 370/445 |
| 5,109,384 A | * | 4/1992 | Tseung | 714/748 |
| 5,237,670 A | * | 8/1993 | Wakerly | 710/100 |
| 6,842,433 B2 | * | 1/2005 | West et al. | 370/312 |

FOREIGN PATENT DOCUMENTS

| | | |
|---|---|---|
| JP | 05-073214 | 3/1993 |
| JP | 6-243052 | 9/1994 |
| JP | 07-013880 | 1/1995 |
| JP | 09-233058 | * 5/1997 |
| JP | 11-045214 | 2/1999 |
| JP | 2000-201198 | 7/2000 |
| JP | 2000-251260 | 9/2000 |
| JP | 2001-006344 | 1/2001 |

* cited by examiner

*Primary Examiner*—Robert Beausoliel
*Assistant Examiner*—Elmira Mehrmanesh
(74) *Attorney, Agent, or Firm*—Morgan, Lewis & Bockius LLP (57) ABSTRACT

With regard to two-way clock synchronous serial communication conducted between a back-end microcomputer 16 and a front-end microcomputer 8, data is sent from the front-end microcomputer 8 to the back-end microcomputer 16 in a form of responding to data sent from the back-end microcomputer 16 between the back-end microcomputer 16 and the front-end microcomputer 8 and from the sending side, sending target data formed by adding a byte for error detection to a byte which is the original sending target is sent and in the receiving side, when a byte corresponding to the byte for error detection is received, error detection of received data is performed using said byte and when an error is detected in the received data, by providing notification to the effect that a communication error occurrs from the receiving side to the sending side.

2 Claims, 4 Drawing Sheets

DISK REPRODUCING APPARATUS

BACKGROUND OF THE INVENTION

The present invention relates to a disk reproducing apparatus for reproducing information recorded on a disk-shaped record medium such as a DVD (Digital Video Disc), and to the disk reproducing apparatus for incorporating two microcomputers and controlling the entire operation by cooperation between these microcomputers.

In a disk reproducing apparatus for reproducing information recorded on a DVD which is a kind of disk-shaped record medium, the entire operation may be controlled by cooperation between two microcomputers. Clock synchronous serial communication is generally conducted between these two microcomputers.

Here, in the clock synchronous serial communication, by adopting techniques disclosed in publications of the Unexamined Japanese Patent Application Publication Nos. Hei6-243052 and 2000-201198, communication can be recovered even in case that a communication error resulting from mixing of noise into a clock occurs.

However, in the techniques disclosed in the publications, there is a problem that a data error occurring due to mixing of noise into data itself is missed. Because of this, even when the techniques disclosed in the publications are applied to communication between two microcomputers for control incorporated into the disk reproducing apparatus, a problem that a malfunction of causing trouble in which an image or a sound breaks occurs is feared.

SUMMARY OF THE INVENTION

Therefore, an object of the invention is to provide a disk reproducing apparatus for reducing occurrence of trouble in which an image or a sound breaks to a minimum by detecting a communication error between two microcomputers for control incorporated more surely and recovering communication quickly.

In order to achieve the object, the invention is characterized in that in a disk reproducing apparatus for controlling the entire operation by cooperation between two microcomputers, comprising a first microcomputer for performing control of an operation for reproducing information recorded on a disk which is a disk-shaped record medium, and a second microcomputer for performing control of an operation for outputting information reproduced from the disk, four signal lines for respectively transmitting a control signal BUSY/-RDY which is sent from the first microcomputer to the second microcomputer and indicates whether or not the first microcomputer is in a communicable state, a control signal BUSCLR which is sent from the second microcomputer to the first microcomputer and instructs the first microcomputer on initialization, a clock signal sent from the first microcomputer to the second microcomputer for synchronization in the case that the second microcomputer communicates with the first microcomputer, and a data signal for conducting serial communication between the first microcomputer and the second microcomputer are provided between the first microcomputer and the second microcomputer, and it is constructed so that the sending side sends sending target data formed by adding a byte for error detection in which each bit is exclusive OR of a corresponding bit of a byte which is a sending target after a byte which is the original sending target and when a byte corresponding to the byte for error detection is received, the receiving side performs error detection of received data using said byte, and in the case that the first microcomputer is in the receiving side, when an error is detected in received data, the control signal BUSY/-RDY is not shifted to a state indicating communicability and when the control signal BUSCLR shifts to a state of instructing initialization, a communication state is initialized and it is shifted to a receivable state and then the control signal BUSY/-RDY is shifted to the state indicating communicability, and in the case that the second microcomputer is in the sending side, when the control signal BUSY/-RDY does not shift to a state indicating that the first microcomputer is communicable at a point in time when predetermined time elapses since the last byte of the sending target data is sent, it is decided that a communication error occurs and the control signal BUSCLR is shifted to a state of instructing initialization and subsequently, after the control signal BUSY/-RDY shifts to the state indicating that it is communicable, the sending target data sent immediately before is resent from the first byte after shifting the control signal BUSCLR to a state in which initialization is not instructed, and in the case that the second microcomputer is in the receiving side, when an error is present in received data, the control signal BUSCLR is shifted to a state of instructing initialization and subsequently, after the control signal BUSY/-RDY shifts to a state indicating that the first microcomputer is communicable, it is switched to a sending state after shifting the control signal BUSCLR to a state in which initialization is not instructed and the sending target data sent immediately before is resent from the first byte, and in the case that the first microcomputer is in the sending side, when sending of all the bytes of the sending target data is completed, after maintaining the control signal BUSY/-RDY at a state in which communicability is not indicated until predetermined time elapses, the control signal BUSY/-RDY is shifted to a state indicating communicability after being switched to a receiving state and also, when the control signal BUSCLR shifts to a state of instructing initialization by the time when the predetermined time elapses since sending of all the last bytes of the sending target data is completed, a communication state is initialized and it is shifted to a receivable state and then the control signal BUSY/-RDY is shifted to the state indicating communicability.

Also, the invention is characterized in that in a disk reproducing apparatus for reproducing information recorded on a disk which is a disk-shaped record medium, the disk reproducing apparatus for incorporating a first microcomputer and a second microcomputer and controlling the entire operation by cooperation between these two microcomputers, with regard to two-way communication conducted between the first microcomputer and the second microcomputer, it is constructed so that data is sent from the second microcomputer to the first microcomputer in a form of responding to data sent from the first microcomputer between the first microcomputer and the second microcomputer and from the sending side, sending target data formed by adding a byte for error detection to a byte which is the original sending target is sent and in the receiving side, when a byte corresponding to the byte for error detection is received, error detection of received data is performed using said byte and when an error is detected in the received data, by providing notification to the effect that a communication error occurs from the receiving side to the sending side, the first microcomputer becomes the sending side and the second microcomputer becomes the receiving side and the sending target data last sent from the first microcomputer to the second microcomputer is resent from the first byte.

DETAILED DESCRIPTION OF THE PREFERRED EMBODIMENTS

Figure 1:
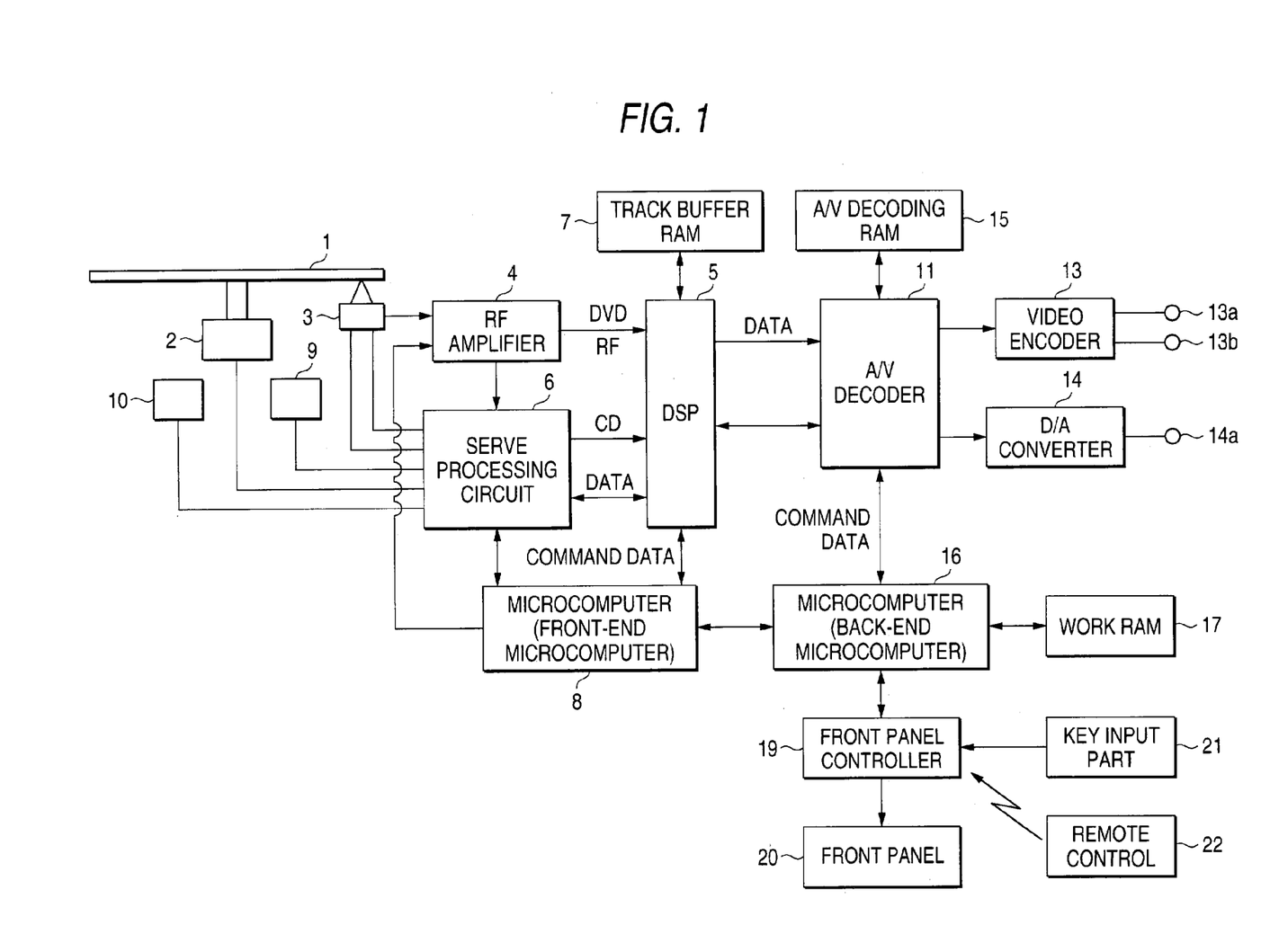
FIG. 1 is a block diagram of a disk reproducing apparatus which is one embodiment of the invention.

An embodiment of the invention will be described below with reference to the drawings. FIG. 1 is a block diagram of a disk reproducing apparatus which is one embodiment of the invention. An output of a pickup 3 for detecting information from a disk 1 rotated and driven by a disk motor 2 is guided to a signal processing circuit 5 and a servo processing circuit 6 through an RF amplifier 4, and an output of the servo processing circuit 6 is guided to a digital signal processor (hereinafter called "DSP") 5.

Also, track buffer RAM (Random Access Memory) 7 for once storing data amplified by the RF amplifier 4 and decoded compliant with DVD standards (where data is compressed by MPEG (Motion Picture Expert Group) here) is connected to the DSP 5. These RF amplifier 4, DSP 5 and servo processing circuit 6 are controlled by a microcomputer 8. Thus, the microcomputer 8 performs control of an operation for reproducing information from the disk 1 and is hereinafter referred to as "a front-end microcomputer".

The servo processing circuit 6 performs servo control of a focusing servo or a tracking servo to the pickup 3 according to a command or control data sent and received from the front-end microcomputer 8 through the DSP 5 and also performs control of a thread motor 9 for moving the entire pickup 3 in a radial direction of the disk 1 or performs control of a tray motor 10 for driving a tray (not shown) for loading the disk 1.

Incidentally, a reproduction signal of the case that the disk 1 loaded into the tray is a DVD is inputted to the DSP 5 through the RF amplifier 4 and on the other hand, a reproduction signal of the case that the disk 1 loaded into the tray is a CD-ROM (Compact Disc-Read Only Memory) is inputted from the RF amplifier 4 to the DSP 5 through the servo processing circuit 6. The DSP 5 also performs decoding processing of these DVD data or decoding processing of CD-ROM data.

Also, the DSP 5 is connected to an A/V (Audio/Video) decoder 11, and an output of the A/V decoder 11 is connected to a video encoder 13 and a D/A converter 14. The A/V decoder 11 expands data compressed by MPEG read from the track buffer RAM 7. Also, A/V decoding RAM 15 for storing several screenfuls of expanded digital data is connected to the A/V decoder 11.

Also, the A/V decoder 11 is connected to a microcomputer 16 and work RAM 17 is connected to the microcomputer 16. Incidentally, the microcomputer 16 performs control of an operation for outputting information reproduced from the disk 1 and is hereinafter referred to as "a back-end microcomputer".

Also, a front panel controller 19 for performing display control of a front panel 20 comprising an LCD is connected to the back-end microcomputer 16, and an output of a key input part 21 is guided to the front panel controller 19, and also the front panel controller 19 is provided with a receiving part (not shown) for receiving a sent signal from a remote control 22.

Here, an operation at the time of reproduction in the disk reproducing apparatus of the configuration described above will be described briefly. Data recorded on the disk 1 is detected by the pickup 3, and waveform shaping and amplification are performed by the RF amplifier 4 and then, the data is decoded compliant with DVD standards in the DSP 5. The decoded data is sequentially accumulated in the track buffer RAM 7 in a state of being compressed by MPEG and waits for a readout request from the back-end microcomputer 16.

Then, the data accumulated in the track buffer RAM 7 is sequentially read out according to the readout request from the back-end microcomputer 16 and is transferred to the A/V decoder 11 and expansion of compressed data by MPEG is performed herein and is decoded into video data. After the decoded video data is once accumulated in the A/V decoding RAM 15, the video data is again read out and sequentially transferred to the video encoder 13 and is converted into an analog video signal herein and is outputted from video output terminals 13a, 13b.

On the other hand, in a manner similar to the video data, audio data compressed by MPEG is sequentially accumulated in the track buffer RAM 7 and is sequentially read out according to a readout request from the back-end microcomputer 16 and is transferred to the A/V decoder 11 and expansion of compressed data by MPEG is performed herein and is decoded into audio data. After the decoded audio data is once accumulated in the A/V decoding RAM 15, the audio data is again read out and sequentially transferred to the D/A converter 14 and is converted into an analog audio signal herein and is outputted from an audio output terminal 14a.

In such a reproducing operation process, when the data accumulated in the track buffer RAM 7 is sequentially read out according to the read out request from the back-end microcomputer 16, it is constructed so as to sequentially overwrite the data by the next data and sequentially output image data to the subsequent signal reproduction system by repeating this.

Also, similar contents apply to the A/V decoding RAM 15, and when the data accumulated in the A/V decoding RAM 15 is sequentially read out according to the readout request from the back-end microcomputer 16, it is constructed so as to sequentially overwrite the data by the next data read and transferred from the track buffer RAM 7 and sequentially output image data to the subsequent signal reproduction system by repeating this.

The reproducing operation is performed in this manner, and an operation of the entire disk reproducing apparatus is controlled by cooperation between the front-end microcomputer 8 and the back-end microcomputer 16. Communication between the front-end microcomputer 8 and the back-end microcomputer 16 will be described below.

Figure 2:
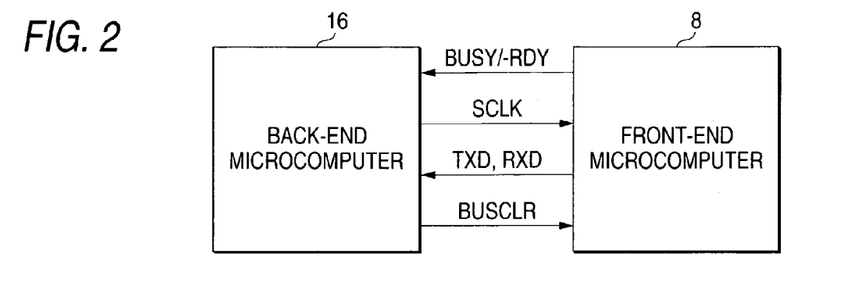
FIG. 2 is a diagram showing connections for conducting communication between a front-end microcomputer and a back-end microcomputer.

As shown in FIG. 2, connections between the front-end microcomputer 8 and the back-end microcomputer 16 are made by four signal lines for respectively transmitting a control signal BUSY/-RDY which is sent from the front-end microcomputer 8 to the back-end microcomputer 16 and indicates whether or not the front-end microcomputer 8 is in a communicable state, a clock signal SCLK sent from the back-end microcomputer 16 to the front-end microcomputer 8, a data signal RXD sent from the back-end microcomputer 16 to the front-end microcomputer 8 and a data signal TXD sent from the front-end microcomputer 8 to the back-end microcomputer 16, and a control signal BUSCLR which is sent from the back-end microcomputer 16 to the front-end microcomputer 8 and instructs the front-end microcomputer 8 on initialization.

Using such four signal lines, two-way clock synchronous serial communication is conducted between the front-end microcomputer 8 and the back-end microcomputer 16. However, the front-end microcomputer 8 does not send data to the back-end microcomputer 16 spontaneously. That is, the front-end microcomputer 8 sends data to the back-end microcomputer 16 in a form of responding to data sent from the back-end microcomputer 16. Also, the front-end microcomputer 8 sends and receives data in synchronization with a clock signal sent from the back-end microcomputer 16.

In the front-end microcomputer 8 and the back-end microcomputer 16, at the time of sending, sending target data formed by adding a byte for error detection to a byte of the original sending target is sent and on the other hand, at the time of receiving, when a byte corresponding to the byte for error detection is received, error detection of received data is performed using said byte. Incidentally, in the embodiment, each bit of the byte for error detection is set to exclusive OR of a corresponding bit of each the byte of the sending target. Also, the byte for error detection is added after the byte of the original sending target.

The back-end microcomputer 16 sets the control signal BUSCLR to the front-end microcomputer 8 at a high level (hereinafter called "H") in the case of starting communication with the front-end microcomputer 8.

The front-end microcomputer 8 shifts the control signal BUSY/-RDY to the back-end microcomputer 16 to "H" in the case that itself is in operation, and shifts it to "L" in the case that itself is not in operation.

The case that the back-end microcomputer 16 is in the sending side and the front-end microcomputer 8 is in the receiving side will be described. First, an operation of the back-end microcomputer 16 which is in the sending side will be described. As shown in each timing chart of FIGS. 3 to 6, in the case of switching to a sending state, after checking that the control signal BUSY/-RDY from the front-end microcomputer 8 is in "L", sending of sending target data RXD is started. The sending target data RXD is sent along with a clock SCLK by one byte. Thereafter, the sending target data RXD is sent along with the clock SCLK by one byte every time the control signal BUSY/-RDY from the front-end microcomputer 8 shifts from "H" to "L".

Figure 3:
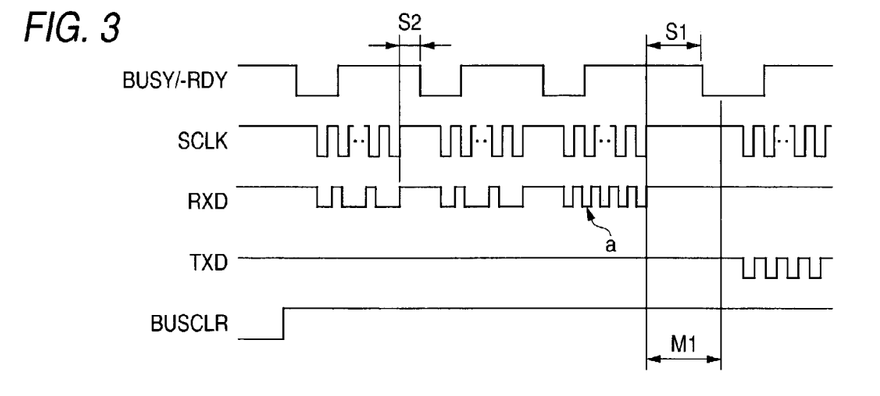
FIG. 3 is a timing chart of each signal at the time when a communication error does not occur in the case that the sending side is the back-end microcomputer and the receiving side is the front-end microcomputer.

Then, as shown in the timing chart of FIG. 3, in the case that the control signal BUSY/-RDY from the front-end microcomputer 8 shifts to "L" at a point in time when predetermined time M1 elapses since the last byte (byte for error detection) a of the sending target data RXD is sent, it is recognized that a communication error does not occur and it is switched to a receiving state. Here, the predetermined time M1 is time longer than time S1 necessary for the front-end microcomputer 8 to perform error detection.

However, as shown in the timing chart of FIG. 5, in the case that the control signal BUSY/-RDY from the front-end microcomputer 8 is in "L" at a point in time when predetermined time M2 elapses since the last byte a of the sending target data RXD is sent, error detection is not performed in the front-end microcomputer 8 (in other words, it becomes the number of sending bytes>the number of receiving bytes) from the viewpoint of an operation described below at the time of receiving of the front-end microcomputer 8, so that it is decided that a communication error due to byte deviation occurs and the control signal BUSCLR to the front-end microcomputer 8 is shifted to "L".

Here, the predetermined time M2 is time longer than the original time S2 necessary for the control signal BUSY/-RDY from the front-end microcomputer 8 to shift to "L" since a byte other than the byte for error detection is sent and shorter than the time S1 necessary for the front-end microcomputer 8 in the receiving side to perform error detection.

Figure 4:
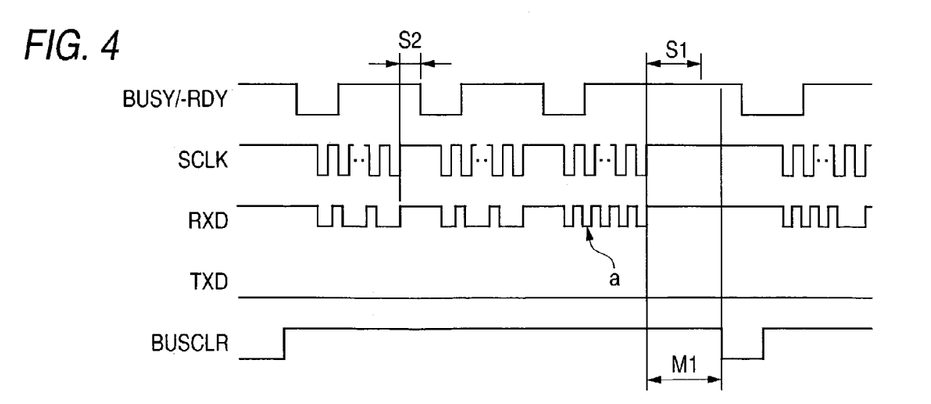
FIG. 4 is a timing chart of each the signal at the time when a communication error which does not result from byte deviation occurs in the case that the sending side is the back-end microcomputer, and the receiving side is the front-end microcomputer.

On the other hand, as shown in the timing chart of FIG. 4, in the case that the control signal BUSY/-RDY from the front-end microcomputer 8 shifts to "H" at a point in time when the predetermined time M1 elapses since the last byte a of the sending target data RXD is sent, it is recognized that a communication error occurs and the control signal BUSCLR to the front-end microcomputer 8 is shifted to "L".

Figure 6:
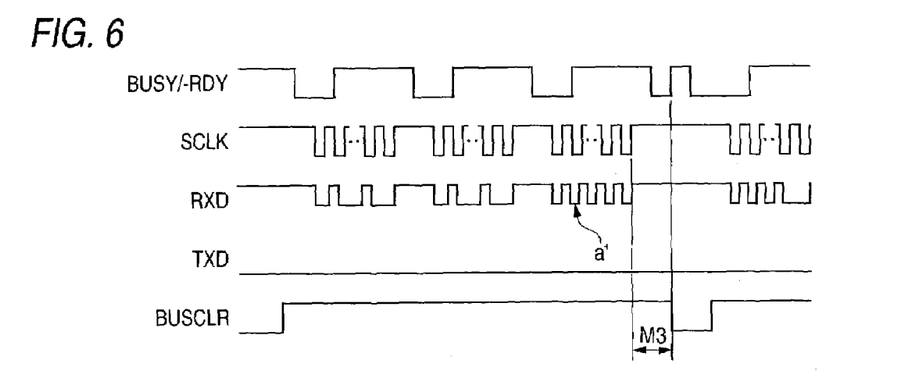
FIG. 6 is a timing chart of each the signal at the time when a communication error due to byte deviation resulting in the number of sending bytes<the number of receiving bytes occurs in the case that the sending side is the back-end microcomputer and the receiving side is the front-end microcomputer.

Also, as shown in the timing chart of FIG. 6, in the case that the control signal BUSY/-RDY from the front-end microcomputer 8 is in "H" at a point in time when predetermined time M3 elapses since a byte a' which is not the last byte of the sending target data RXD is sent, the front-end microcomputer 8 performs an error detection operation using a byte which is not the byte for error detection (in other words, it becomes the number of sending bytes>the number of receiving bytes) from the viewpoint of an operation described below at the time of receiving of the front-end microcomputer 8, so that it is decided that a communication error due to byte deviation occurs and the control signal BUSCLR to the front-end microcomputer 8 is shifted to "L".

Here, the predetermined time M3 is time longer than the original time S2 necessary for the control signal BUSY/-RDY from the front-end microcomputer 8 to shift to "L" since a byte other than a byte CHECK for error detection is sent and shorter than the time S1 necessary for the front-end microcomputer 8 in the receiving side to perform error detection.

Figure 5:
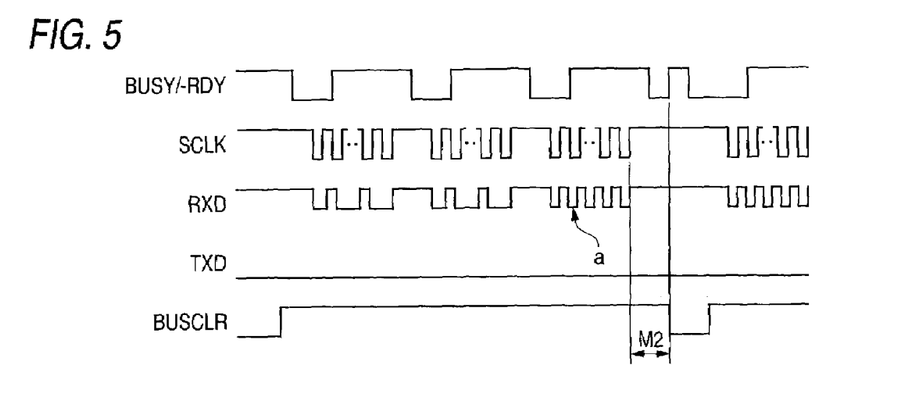
FIG. 5 is a timing chart of each the signal at the time when a communication error due to byte deviation resulting in the number of sending bytes>the number of receiving bytes occur in the case that the sending side is the back-end microcomputer and the receiving side is the front-end microcomputer.

Then, after shifting the control signal BUSCLR to the front-end microcomputer 8 to "L", as shown in each the timing chart of FIGS. 4 to 6, in the case of checking that the control signal BUSY/-RDY from the front-end microcomputer 8 is in "L" (the front-end microcomputer 8 is in a receivable state), the sending target data RXD sent immediately before is resent from the first byte after shifting the control signal BUSCLR to "H".

Next, an operation of the front-end microcomputer 8 which is in the receiving side will be described. At the time of receiving, the front-end microcomputer 8 receives data RXD sent from the back-end microcomputer 16 in synchronization with a clock SCLK sent from the back-end microcomputer 16. As shown in each the timing chart of FIGS. 3 to 6, the control signal BUSY/-RDY to the back-end microcomputer 16 is shifted to "H" every time receiving of one byte is started and also is shifted to "L" every time receiving of one byte is completed.

However, in the case that a byte a received last corresponds to a byte for error detection, error detection of received data is performed using the byte a received last and when an error is absent in the received data, as shown in the timing chart of FIG. 3, the control signal BUSY/-RDY to the back-end microcomputer 16 is shifted to "L" after being switched to a sending state. On the other hand, when an error is present in the received data, as shown in the timing chart of FIG. 4, the control signal BUSY/-RDY to the back-end microcomputer 16 is not shifted to "L" and is maintained at "H". Incidentally, in the embodiment, error detection of received data is performed by detecting whether or not exclusive OR of each bit of each byte (excluding the last byte) of the received data matches with a value of a corresponding bit of the last byte.

Also, as shown in each the timing chart of FIGS. 4 to 6, when the control signal BUSCLR from the back-end microcomputer 16 shifts to "L", a communication state is initialized, for example, the received data of this time is discarded and it is shifted to a receivable state and then the control signal BUSY/-RDY to the back-end microcomputer 16 is shifted to "L".

The case that the front-end microcomputer 8 is in the sending side and the back-end microcomputer 16 is in the receiving side will be described. First, an operation of the front-end microcomputer 8 which is in the sending side will be described. As shown in each timing chart of FIGS. 7 to 10, sending target data TXD is sent by one byte in synchronization with a clock SCLK supplied from the back-end microcomputer 16, and the control signal BUSY/-RDY to the back-end microcomputer 16 is shifted to "H" every time sending of one byte is started and is shifted to "L" every time sending of one byte is completed.

Figure 7:
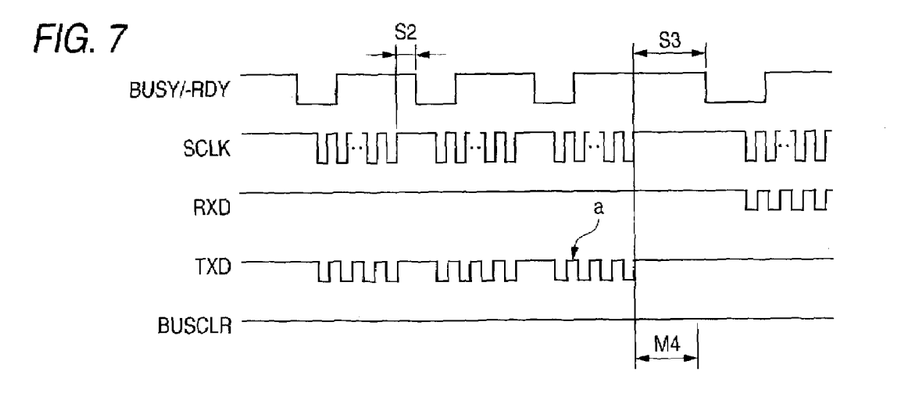
FIG. 7 is a timing chart of each the signal at the time when a communication error does not occur in the case that the sending side is the front-end microcomputer and the receiving side is the back-end microcomputer.

Then, as shown in the timing chart of FIG. 7, when predetermined time S3 elapses since sending of the last byte (byte for error detection) a of the sending target data TXD is completed, the control signal BUSY/-RDY to the back-end microcomputer 16 is shifted to "L" after being switched to a receivable state. Here, the predetermined time S3 is time longer than time M4 necessary for the back-end microcomputer 16 to perform error detection.

Figure 8:
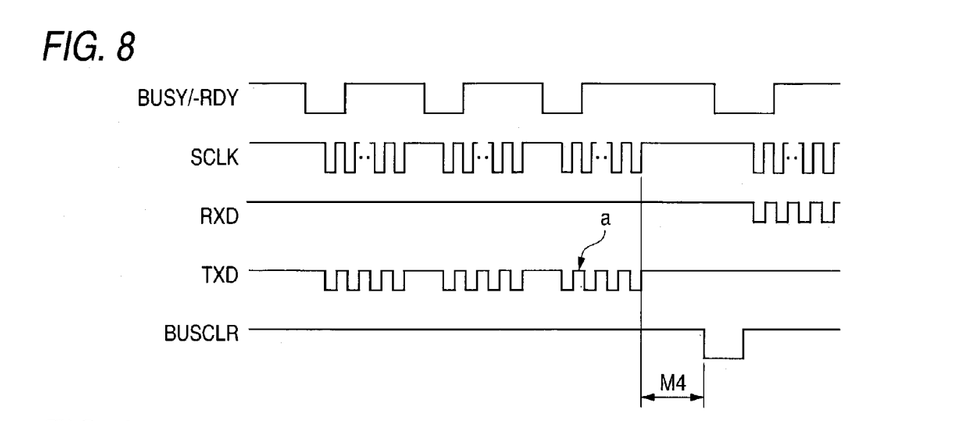
FIG. 8 is a timing chart of each the signal at the time when a communication error which does not result from byte deviation occurs in the case that the sending side is the front-end microcomputer and the receiving side is the back-end microcomputer.
Figure 9:
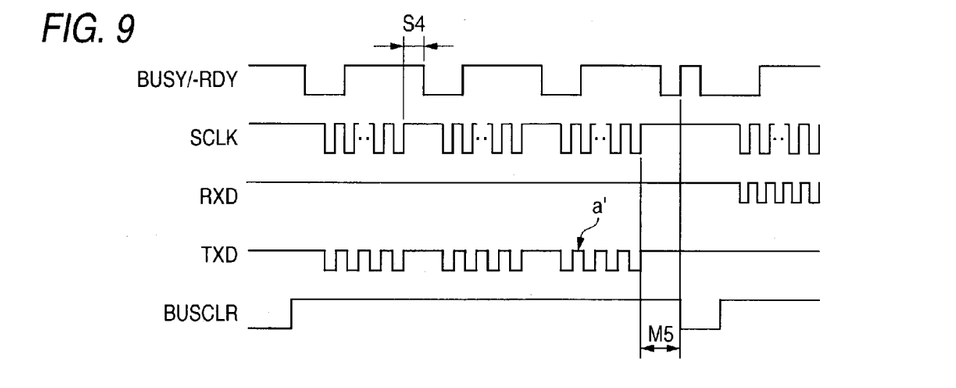
FIG. 9 is a timing chart of each the signal at the time when a communication error due to byte deviation resulting in the number of sending bytes<the number of receiving bytes occurs in the case that the sending side is the front-end microcomputer and the receiving side is the back-end microcomputer.
Figure 10:
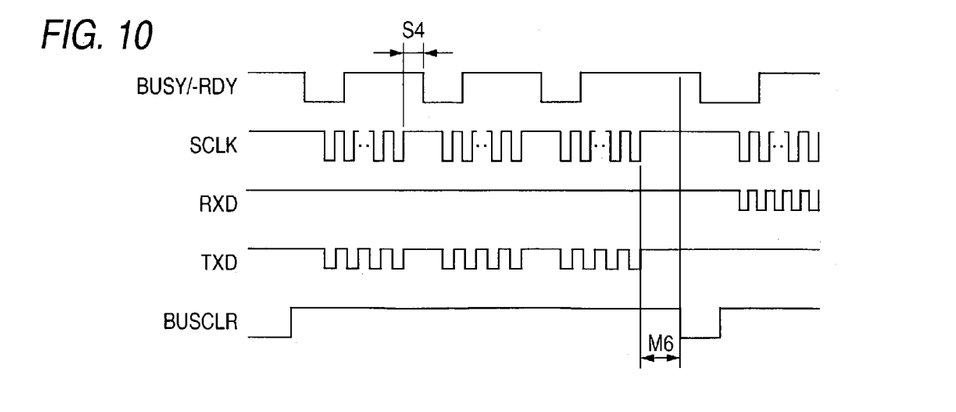
FIG. 10 is a timing chart of each the signal at the time when a communication error due to byte deviation resulting in the number of sending bytes>the number of receiving bytes occurs in the case that the sending side is the front-end microcomputer and the receiving side is the back-end microcomputer.

However, in the case that the control signal BUSCLR from the back-end microcomputer 16 shifts to "L" by the time when the predetermined time S3 elapses since sending of the last byte a of the sending target data TXD is completed as shown in the timing charts of FIGS. 8 and 10, and the case that the control signal BUSCLR from the back-end microcomputer 16 shifts to "L" though sending of the last byte of the sending target data TXD is not completed (a' in FIG. 9 shows a byte which is not the last byte of the sending target data TXD) as shown in the timing charts of FIG. 9, since it is considered that a communication error occurs, at that point in time, a communication state is initialized and it is shifted to a receivable state and then the control signal BUSY/-RDY to the back-end microcomputer 16 is shifted to "L".

Next, an operation of the back-end microcomputer 16 which is in the receiving side will be described. As shown in each the timing chart of FIGS. 7 to 10, sending of a clock SCLK is started in the case of switching to a receiving state. The clock SCLK is sent by one byte. Thereafter, the clock SCLK by one byte is sent every time the control signal BUSY/-RDY from the front-end microcomputer 8 shifts from "H" to "L".

Then, in the case that a byte a received last corresponds to a byte for error detection, error detection of received data is performed using the byte a received last and when an error is absent in the received data, as shown in the timing chart of FIG. 7, the control signal BUSCLR to the front-end microcomputer 8 is maintained at "H" and thereafter in the case of checking that the control signal BUSY/-RDY from the front-end microcomputer 8 shifts to "L" (the front-end microcomputer 8 shifts to a receivable state), it is switched to a sending state and sending of the next sending target data RXD is started. On the other hand, when an error is present in the received data, the control signal BUSCLR to the front-end microcomputer 8 is shifted to "L" as shown in the timing chart of FIG. 8.

However, in the case that the byte received last is not a byte for error detection actually but is regarded as the byte for error detection by the back-end microcomputer 16 which is in the receiving side because byte deviation resulting in the number of sending bytes<the number of receiving bytes occur, the control signal BUSY/-RDY from the front-end microcomputer 8 is not maintained at "H" actually though it should be maintained at "H" over the predetermined time S3 described above originally from the viewpoint of the back-end microcomputer 16, so that as shown in the timing chart of FIG. 9, in the case that the control signal BUSY/-RDY from the front-end microcomputer 8 is in "L" at a point in time when predetermined time M5 elapses since a byte a' corresponding to the byte for error detection is received, it is decided that a communication error due to byte deviation resulting in the number of sending bytes<the number of receiving bytes occurs and the control signal BUSCLR to the front-end microcomputer 8 is shifted to "L".

Here, the predetermined time M5 is time longer than the original time S4 necessary for the control signal BUSY/-RDY from the front-end microcomputer 8 to shift to "L" since a byte other than a byte CHECK for error detection is sent and shorter than the predetermined time S3 described above.

Also, in the case that the byte received last is a byte for error detection actually but is not regarded as the byte for error detection by the back-end microcomputer 16 which is in the receiving side because byte deviation resulting in the number of sending bytes>the number of receiving bytes occurs, the control signal BUSY/-RDY from the front-end microcomputer 8 does not shift to "L" actually though it should have shifted to "L" after the predetermined time S4 elapses originally from the viewpoint of the back-end microcomputer 16, so that as shown in the timing chart of FIG. 10, in the case that the control signal BUSY/-RDY from the front-end microcomputer 8 is in "H" at a point in time when predetermined time M6 elapses since a byte is received last though the byte received last a does not correspond to the byte for error detection, it is decided that a communication error due to byte deviation resulting in the number of sending bytes>the number of receiving bytes occurs and the control signal BUSCLR to the front-end microcomputer 8 is shifted to "L".

Here, the predetermined time M6 is time longer than the original time S4 necessary for the control signal BUSY/-RDY from the front-end microcomputer 8 to shift to "L" since a byte other than a byte CHECK for error detection is sent and shorter than the predetermined time S3 described above.

Then, as shown in each the timing chart of FIGS. 8 to 10, after shifting the control signal BUSCLR to the front-end microcomputer 8 to "L", it is checked that the control signal BUSY/-RDY from the front-end microcomputer 8 shifts to "L" (the front-end microcomputer shifts to a receivable state) and then, it is switched to a sending state after shifting the control signal BUSCLR to the front-end microcomputer 8 to "H" and the sending target data RXD sent immediately before is resent from the first byte.

In the embodiment thus, in the case of conducting two-way communication between two microcomputers of the front-end microcomputer 8 and the back-end microcomputer 16, after adding a byte for error detection, a byte which is the original sending target is sent from the sending side and in the receiving side, error detection of received data is performed using the byte for error detection and when an error is detected in the received data, by providing notification to the effect that a communication error occurs from the receiving side to the sending side, the back-end microcomputer 16 becomes the sending side and the front-end microcomputer 8 becomes the receiving side and the sending target data (that is, the data in which the error is detected) sent immediately before from the back-end microcomputer 16 to the front-end microcomputer 8 is resent from the first byte.

Therefore, a communication error resulting from data itself as well as a communication error resulting from a clock are detected and data in which the communication errors are detected can be resent. As a result of this, in the disk reproducing apparatus of the embodiment, a communication error between two microcomputers for control incorporated can be detected more surely to recover communication quickly, with the result that occurrence of trouble in which an image or a sound reproduced breaks can be reduced to a minimum.

Also, in the embodiment, a communication error due to byte deviation can be detected, so that quality of communication improves furthermore and the effect described above becomes more remarkable.

As described above, according to a disk reproducing apparatus of the invention, since a communication error resulting from data itself as well as a communication error resulting from a clock are detected and data in which the communication errors are detected can be resent, a communication error between two microcomputers for control incorporated can be detected more surely to recover communication quickly, with the result that occurrence of trouble in which an image or a sound reproduced breaks can be reduced to a minimum.

What is claimed is:

1. A disk reproducing apparatus for controlling the entire operation by cooperation between two microcomputers, comprising:

a first microcomputer for performing control of an operation for reproducing information recorded on a disk which is a disk-shaped record medium, and a second microcomputer for performing control of an operation for outputting information reproduced from the disk, wherein four signal lines for respectively transmitting a control signal BUSY/-RDY which is sent from said first microcomputer to said second microcomputer and indicates whether or not said first microcomputer is in a communicable state, a control signal BUSCLR which is sent from said second microcomputer to said first microcomputer and instructs said first microcomputer on initialization, a clock signal sent from said second microcomputer to said first microcomputer for synchronization in the case that said first microcomputer communicates with said second microcomputer, and a data signal for conducting two-way clock synchronous serial communication between said first microcomputer and said second microcomputer are provided between said first microcomputer and said second microcomputer, and a sending side sends sending target data formed by adding a byte for error detection in which each bit is exclusive OR of a corresponding bit of a byte which is a sending target after a byte which is the original sending target, and when a byte corresponding to the byte for error detection is received, a receiving side performs error detection of received data using said byte, and in the case that said second microcomputer is in the sending side and said first microcomputer is in the receiving side, when the control signal BUSY/-RDY from said first microcomputer is in a state indicating communicability after primary time, which is from time when said second microcomputer sends the byte for error detection until time when the control signal BUSY/-RDY from said first microcomputer is shifted to a state indicating communicability after bytes other than the byte for error detection are sent elapses, it is decided that error detection is not performed by said first microcomputer and a communication error due to byte displacement occurs and the control signal BUSCLR to said first microcomputer is shifted to a state of instructing initialization, and thereafter a communication state is initialized by said first microcomputer to be shifted to a receivable state, and then the control signal BUSY/-RDY to said second microcomputer is shifted to the state indicating communicability, and thereafter the control signal BUSCLR is shifted by said second microcomputer to a state in which initialization is not instructed, and then the sending target data sent immediately before is immediately resent from the first byte, and in the case that said second microcomputer is in the sending side and said first microcomputer is in the receiving side when the control signal BUSY/-RDY from said first microcomputer is in a state in which communicability is not indicated after primary time, which is from time when said second microcomputer sends bytes other than the byte for error detection until time when the control signal BUSY/-RDY from said first microcomputer is shifted to a state indicating communicability after bytes other than the byte for error detection are sent elapses, it is decided that error detection is not performed by said first microcomputer through the use of the bytes other than the byte for error detection and a communication error due to byte displacement occurs, and the control signal BUSCLR to said first microcomputer is shifted to a state of instructing initialization, and thereafter a communication state is initialized by said first microcomputer to be shifted to a receivable state, and then the control signal BUSY/-RDY to said second microcomputer is shifted to the state indicating communicability, and thereafter the control signal BUSCLR is shifted by said second microcomputer to a state in which initialization is not instructed, and then the sending target data sent immediately before is immediately resent from the first byte.

2. A disk reproducing apparatus for controlling the entire operation by cooperation between two microcomputers, comprising:

a first microcomputer for performing control of an operation for reproducing information recorded on a disk which is a disk-shaped record medium, and a second microcomputer for performing control of an operation for outputting information reproduced from the disk, wherein four signal lines for respectively transmitting a control signal BUSY/-RDY which is sent from said first microcomputer to said second microcomputer and indicates whether or not said first microcomputer is in a communicable state, a control signal BUSCLR which is sent from said second microcomputer to said first microcomputer and instructs said first microcomputer on initialization, a clock signal sent from said second microcomputer to said first microcomputer for synchronization in the case that said first microcomputer communicates with said second microcomputer, and a data signal for conducting two-way clock synchronous serial communication between said first microcomputer and said second microcomputer are provided between said first microcomputer and said second microcomputer, and a sending side sends sending target data formed by adding a byte for error detection in which each bit is exclusive OR of a corresponding bit of a byte which is a sending target after a byte which is the original sending target, and when a byte corresponding to the byte for error detection is received, a receiving side performs error detection of received data using said byte, and in the case that said first microcomputer is in the sending side and said second microcomputer is in the receiving side, when the control signal BUSY/-RDY from said first microcomputer is in a state indicating communicability after primary time, which is from time when said second microcomputer receives a byte by regarding it as the byte for error detection until time when the control signal BUSY/-RDY from said first microcomputer is shifted to a state indicating communicability after bytes other than the byte for error detection are sent elapses, it is decided that the received byte is not the byte for error detection in actuality and a communication error due to byte displacement occurs, and the control signal BUSCLR to said first microcomputer is shifted to a state of instructing initialization, and thereafter a communication state is initialized by said first microcomputer to be shifted to a receivable state, and then the control signal BUSY/-RDY to said second microcomputer is shifted to the state indicating communicability, and thereafter the control signal BUSCLR is shifted by said second microcomputer to a state in which initialization is not instructed, and then it is switched to the sending state and the sending target data sent immediately before is immediately resent from the first byte, and in the case that said first microcomputer is in the sending side and said second microcomputer is in the receiving side, when the control signal BUSY/-RDY from said first microcomputer is in a state in which communicability is not indicated after primary time, which is from time when said second microcomputer receives a byte by not recording it as the byte for error detection until time when the control signal BUSY/-RDY from said first microcomputer is shifted to a state indicating communicability after bytes other than the byte for error detection are sent elapses, it is decided that the received byte is the byte for error detection in actuality and a communication error due to byte displacement occurs, and the control signal BUSCLR to said first microcomputer is shifted to a state of instructing initialization, and thereafter a communication state is initialized by said first microcomputer to be shifted to a receivable state, and then the control signal BUSY/-RDY to said second microcomputer is shifted to the state indicating a communicability, and thereafter the control signal BUSCLR is shifted by said second microcomputer to a state in which initialization is not instructed, and then it is switched to the sending state, and the sending target data sent immediately before is immediately resent from the first byte.

* * * * *